United States Patent
Watanabe et al.

(10) Patent No.: US 6,828,903 B2
(45) Date of Patent: Dec. 7, 2004

(54) METHOD AND APPARATUS FOR DETECTING POSITION OF OBJECT PRESENT IN A SURROUNDING DETECTION ZONE OF AUTOMOTIVE VEHICLE

(75) Inventors: Seigo Watanabe, Yokohama (JP); Yoshihiro Satoh, Kanagawa (JP); Hiroshi Takahashi, Tokyo (JP)

(73) Assignee: Nissan Motor Co., Ltd., Yokohama (JP)

(*) Notice: Subject to any disclaimer, the term of this patent is extended or adjusted under 35 U.S.C. 154(b) by 14 days.

(21) Appl. No.: 09/973,718

(22) Filed: Oct. 11, 2001

(65) Prior Publication Data

US 2002/0044048 A1 Apr. 18, 2002

(30) Foreign Application Priority Data

Oct. 12, 2000 (JP) ........................................ 2000-312077

(51) Int. Cl.⁷ ................................................ B60Q 1/00
(52) U.S. Cl. ....................... 340/435; 340/436; 340/937; 348/118; 348/148; 701/301
(58) Field of Search ................................ 340/435, 436, 340/903, 555, 437, 937; 180/167, 169; 701/300, 301, 205; 348/118, 148

(56) References Cited

U.S. PATENT DOCUMENTS

| 5,670,935 | A | * | 9/1997 | Schofield et al. | ............ 340/461 |
|---|---|---|---|---|---|
| 5,767,793 | A | | 6/1998 | Agravante et al. | .......... 340/903 |
| 5,959,555 | A | * | 9/1999 | Furuta | .......................... 340/937 |
| 6,035,053 | A | * | 3/2000 | Yoshioka et al. | ............ 382/104 |
| 6,256,584 | B1 | * | 7/2001 | Kodaka et al. | ............. 701/301 |
| 6,265,968 | B1 | * | 7/2001 | Betzitza et al. | ............. 340/436 |
| 6,292,752 | B1 | * | 9/2001 | Franke et al. | ............... 701/300 |

FOREIGN PATENT DOCUMENTS

JP          11-304910          11/1999

OTHER PUBLICATIONS

U.S. Appl. No. 09/957,038, Yamamura, filed Sep. 21, 2001.

* cited by examiner

*Primary Examiner*—Davetta W. Goins
(74) *Attorney, Agent, or Firm*—Foley & Lardner LLP

(57) ABSTRACT

In method and apparatus for detecting a position of an object present in a surrounding detection zone of an automotive vehicle, a distance of the vehicle to the object is measured, the surrounding detection zone of the vehicle is photographed, the photographed surrounding detection zone to extract is image processed at least one longitudinal edge from the photographed surrounding detection zone of the vehicle, and the position of the object to the vehicle is detected on the basis of a direction of the extracted longitudinal edge and a measured value of the distance to the object.

21 Claims, 6 Drawing Sheets

METHOD AND APPARATUS FOR DETECTING POSITION OF OBJECT PRESENT IN A SURROUNDING DETECTION ZONE OF AUTOMOTIVE VEHICLE

BACKGROUND OF THE INVENTION

1. Field of the Invention

The present invention relates to method and apparatus for detecting a position of an object present in a surrounding detection zone of an automotive vehicle.

2. Description of the Related Art

A U.S. Pat. No. 5,767,793 issued on Jun. 16, 1998 and a Japanese Patent Application First Publication No. Heisei 11-304910 published on Nov. 5, 1999 exemplify previously proposed object detecting apparatuses. In these previously proposed object detecting apparatuses, a plurality of ultrasonic sensors are disposed with directions of detection beams deviated, a part of detection ranges of the respective sensors is overlapped to form a plurality of detection ranges, and a rough position of the object is detected according to a detection pattern of the whole sensors.

SUMMARY OF THE INVENTION

Such a radar having a detection beam with a spreading angle as the ultrasonic sensor described above can detect only a distance therefrom to a nearest point of the obstacle and cannot accurately detect a direction of the obstacle with respect to the ultrasonic sensor. Since the radar detects the distance to a nearest one of a plurality of objects present within a radar detection zone the object located at one meter from the radar is present in a case where, for example, a detection range limit is one meter.

A characteristic of a detectable range of the radar prescribes as within some meters in a direction orthogonal to a center axis of a detection beam for each detected distance from the center axis or within some degrees from the center axis. For example, it prescribes as within 0.5 meters in the direction orthogonal to the center axis of the detection beam from the center axis or within 26 degrees from the center axis of the detection beam. In this case, the radar has a measurement error for the object one meter ahead by one meter at a maximum in the direction orthogonal to the center axis from the center axis of the detection beam or the measurement error by 52 degrees at the maximum from the center axis of the detection beam.

Since, in each of the previously proposed vehicular obstacle detecting apparatuses described above, such a radar having the spreading detection beam is used, the distance to the nearest point of the obstacle can accurately be detected but the direction of the obstacle cannot accurately be detected. Hence, it is not possible to accurately detect a position of the obstacle.

In addition, when the object (obstacle) is detected by the radar having the spread detection beam, a width of a convex portion of the object is caught to be wider than an actual convex portion thereof. When each convex portion of both ends falls in a detection range of the radar as far as the convex portion is provided on both ends of a recess portion is concerned, the convex portion of both ends is caught to be wider than the actual convex portion so that the recess portion is accordingly caught to be narrower than the actual recess portion. In certain circumstances, the distance to a deepest portion of the recess portion cannot be detected. In other words, each of the previously proposed vehicular surrounding obstacle detecting apparatuses cannot accurately be detect the convex and recess of the object.

Furthermore, since, in each of the previously proposed vehicular surrounding detecting apparatuses, parts of the detection ranges of a plurality of ultrasonic sensors are mutually overlapped, each of the ultrasonic sensors is needed to be operated with a predetermined time margin in order to prevent an interference of detection beams between the sensors and it takes a considerable time to grasp a rough position of the object, i.e., the obstacle.

It is, hence, an object of the present invention to provide apparatus and method for detecting an object present in a surrounding detection zone of an automotive vehicle which can detect a position and a profile of the obstacle present in a surrounding area of the vehicle with a high accuracy and as early as possible.

The above-described object can be achieved by providing a method for detecting a position of an object present in a surrounding detection zone of an automotive vehicle, comprising: measuring a distance of the vehicle to the object; photographing the surrounding detection zone of the vehicle; image processing the photographed surrounding detection zone to extract at least one longitudinal edge from the photographed surrounding detection zone of the vehicle; and detecting the position of the object to the vehicle on the basis of a direction of the extracted longitudinal edge and a measured value of the distance to the object.

The above-described object can also be achieved by providing an apparatus for detecting a position of an object present in a surrounding detection zone of an automotive vehicle, comprising: a distance measurement unit to measure a distance of the vehicle to the object; a photograph device to photograph the surrounding detection zone of the vehicle; an image processing section that performs an image processing for the photographed surrounding detection zone to extract at least one longitudinal edge from the photographed surrounding detection zone image; and a position detecting section that detects the position of the object to the vehicle on the basis of a direction of the extracted longitudinal edge and a measured value of the distance to the object.

This summary of the invention does not necessarily describe all necessary features so that the invention may also be a sub-combination of these described features.

DETAILED DESCRIPTION OF THE PREFERRED EMBODIMENTS

Reference will hereinafter be made to the drawings in order to facilitate a better understanding of the present invention.

Figure 1:
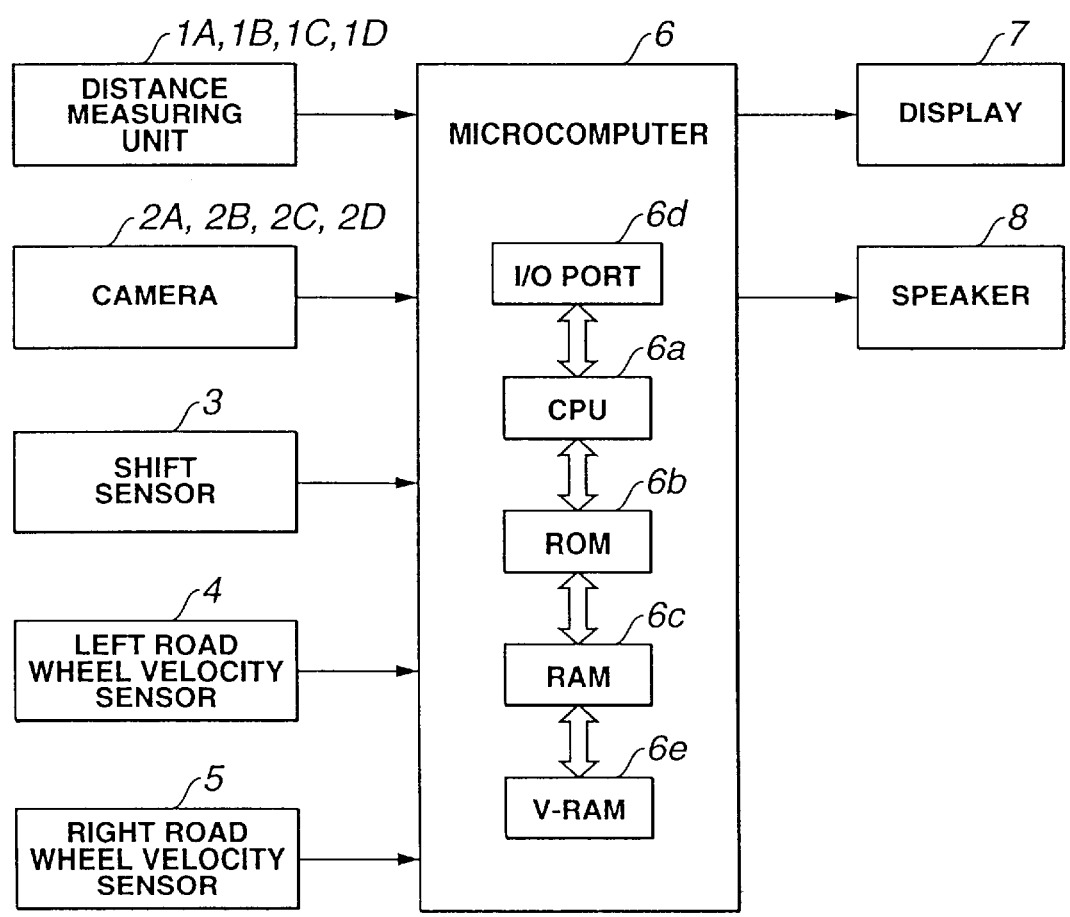
FIG. 1 is a circuit block diagram of an apparatus for detecting a position of an object present in a surrounding detection zone of an automotive vehicle in a preferred embodiment according to the present invention.

FIG. 1 shows a system configuration of an apparatus for detecting an object present in a surrounding detection zone of an automotive vehicle in a preferred embodiment according to the present invention.

Distance measurement units 1A, 1B, 1C, and 1D have spreading detection beams as ultrasonic sensors or microwave radars and detect a distance to a nearest point of an object (hereinafter, also called an obstacle) present in a surrounding area of the vehicle.

Figure 2:
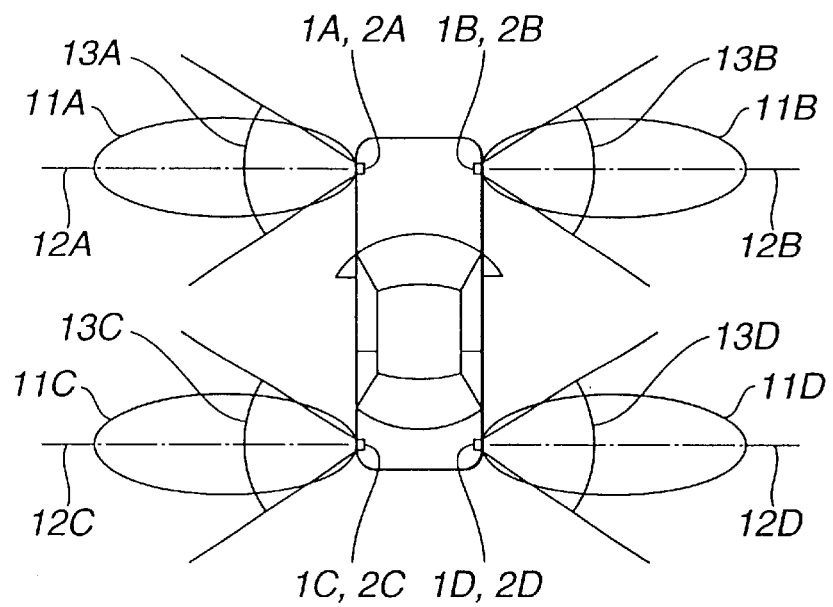
FIG. 2 is a schematic explanatory view representing detection zones of distance measurement units and mounting positions of cameras in the preferred embodiment of the apparatus for detecting the position of the object present in the surrounding detection zone of the automotive vehicle shown in FIG. 1.

In the embodiment, four distance measuring units 1A through 1D are installed on side edge surfaces of a vehicle body located at forward and rearward directions as shown in FIG. 2. A distance from a mounted position of each of the sensors 1A through 1D to the obstacle located aside the vehicle is detected. It is noted that the same distance measuring units may be installed on front and rear end surfaces of the vehicle body which detect the distance to the obstacle present in a vehicular forward direction and present in a vehicular backward direction, as appreciated from FIG. 2.

Figure 3:
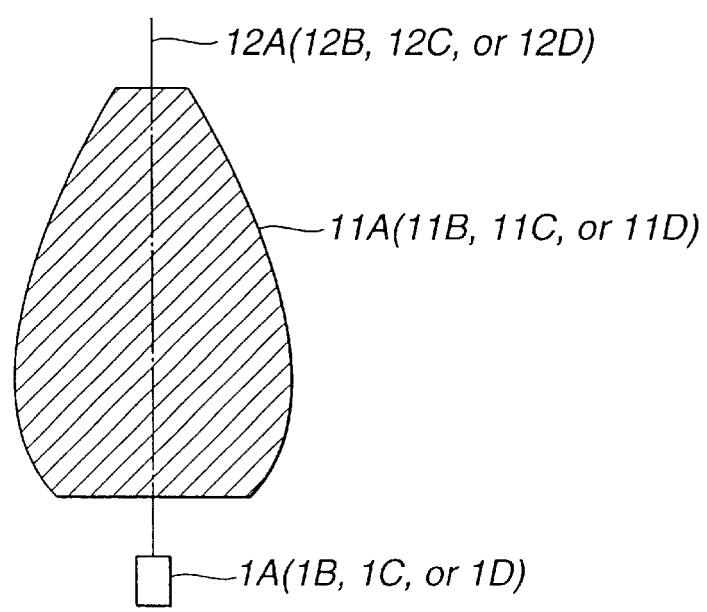
FIG. 3 is a schematic explanatory view representing a distance measurable range of each distance measurement unit shown in FIGS. 1 and 2.

The distance detection characteristic of these distance measuring units 1A through 1D has a width in a direction orthogonal to center axed 12A, 12B, 12C, and 12D of the detection beams as shown in FIG. 3 but cannot detect on which position of the width the obstacle is present. In other words, the distance measuring units 1A through 1D can accurately detect the distance to the obstacle but cannot accurately detect the direction of the obstacle.

Cameras 2A, 2B, 2C, and 2D serve to photograph an object image through photographing units such as CCD (Charge Coupled Device) and C-MOS (Complementary Metal Oxide Semiconductor). In the embodiment, cameras 2A through 2D are installed so as to correspond to respective distance measuring units 1A through 1D. The cameras 2A through 2D photograph vehicular longitudinal side directions, as shown in FIG. 2. Photographing ranges 13A through 13D of these cameras 2A through 2D are made substantially coincident with detection ranges 11A through 1D of the distance measuring units 1A through 1D with the center axed 12A through 12D of detection beams of the distance measuring units 1A through 1D as respective centers. Consequently, the position of the obstacle can efficiently be detected. A shift sensor 3 detects a position of a shift lever of an automatic transmission (not shown) of the vehicle.

In addition, a left road wheel velocity sensor 4 detects a revolution velocity of a left rear road wheel and a right road wheel velocity sensor 5 detects a revolution velocity of a right rear road wheel of the vehicle. The shift sensor 3 and left and right road wheel velocity sensors 4 and 5 can detect a vehicular behavior, viz., the position of the vehicle, the forward direction, the direction, the movement distance, and the movement velocity.

An arithmetic/logical/processing unit 6 having a microcomputer (hereinafter referred simply to the microcomputer) including a CPU (Central Processing Unit) 6a, a ROM (Read Only memory) 6b, and a RAM (Read Only Memory) 6c, I/O port 6d, a V-RAM (Video-RAM) 6e, and the common bus, as shown in FIG. 1. The distance and direction of the obstacle are detected on the basis of the distance to the obstacle detected by the distance measuring units 1A through 1D, vehicular surrounding vide images photographed by cameras 2A through 2D and the vehicular behavior detected by the shift sensor 3 and left and right road wheel velocity sensors 4 and 5. Consequently, the microcomputer 6 detects a position of the object (obstacle). Furthermore, results of detection are displayed through a display 7 and are informed to the vehicular occupant through a speaker 8 for an alarming purpose.

Figure 4:
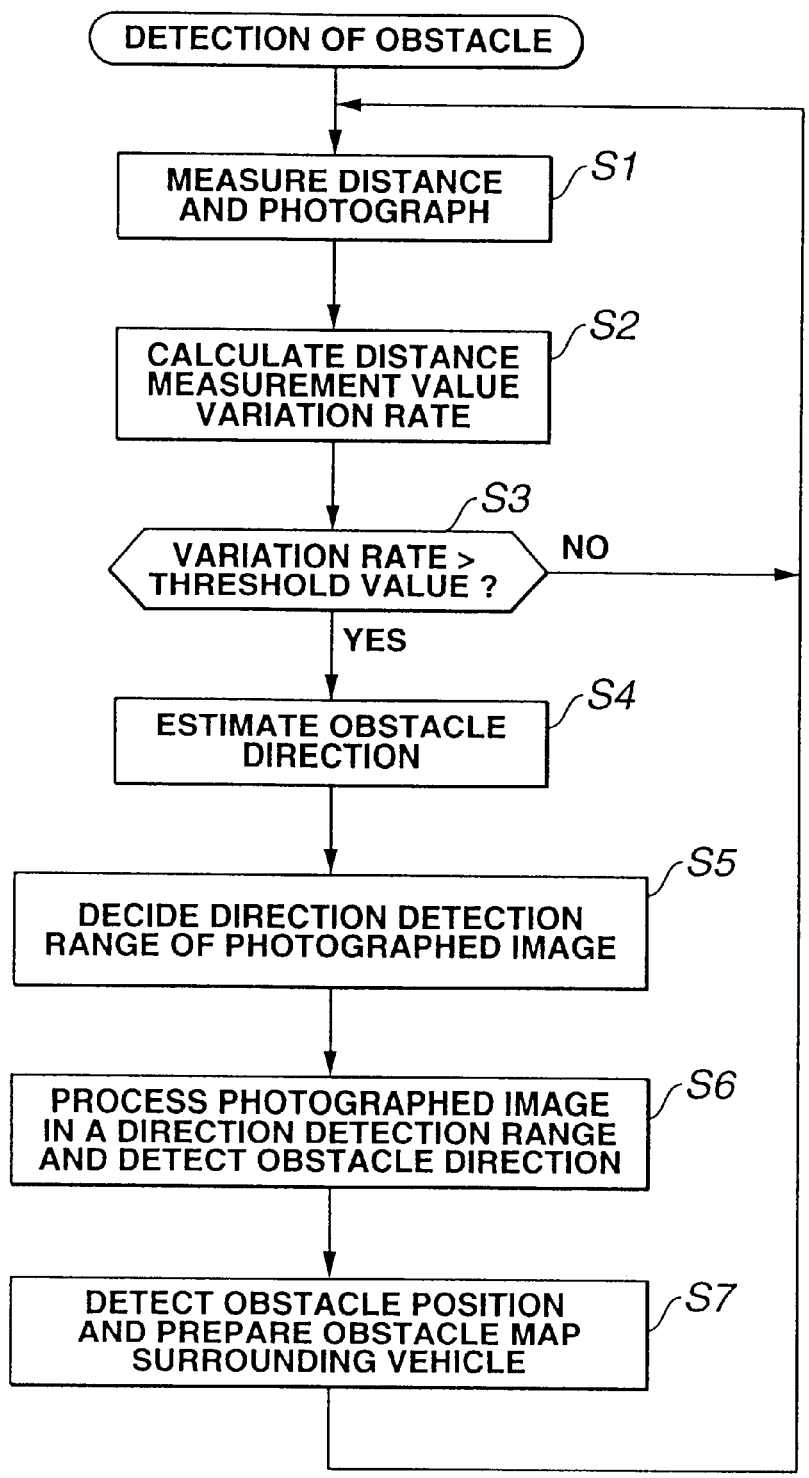
FIG. 4 is an operational flowchart representing an obstacle detection procedure carried out in the apparatus for detecting the position of the object present in the surrounding detection zone shown in FIGS. 1 and 2.

FIG. 4 shows an operational flowchart representing obstacle detecting procedure executed in the preferred embodiment of the apparatus for detecting the object present in the surrounding detection zone as shown in FIG. 1. An operation of the object detecting apparatus in the preferred embodiment will be described with reference to FIG. 4.

CPU 6a of microcomputer 6 executes a program corresponding to the flowchart shown in FIG. 4 in response to a turn on of a main switch (not shown) of microcomputer 6.

At a step S1, a distance to the object is measured by distance measuring units 1A through 1D and cameras 2A through 2D photographs the side directions of the vehicle. It is noted that, in the embodiment, the position of the obstacle present in a left front side direction of the vehicle is detected on the basis of a distance measurement value by distance measuring unit 1A and by photograph image by camera 2A. However, the same procedure can be applied equally well to a detection procedure of the position of the obstacle present in any other of vehicular right front side direction, vehicular left rear side direction, and vehicular right rear side direction on the basis of the corresponding one of distance measuring units 1B through 1D and that of cameras 2B and 2D. Explanations of these cases will herein be omitted.

Figure 5A:
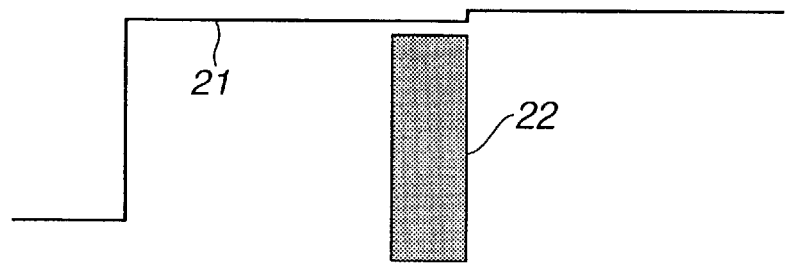
FIGS. 5A and 5B are schematic explanatory view representing a parking zone and measurement results of a distance to an obstacle at the parking zone.

FIG. 5A shows a wall 21 of a parking zone and a parked vehicle 22. In the preferred embodiment, in order to park the vehicle at the parking zone shown in FIG. 5A, the detection of position of the obstacle is exemplified using the distance measuring unit 1A and camera 2A installed in a front left side direction.

Figure 5B:
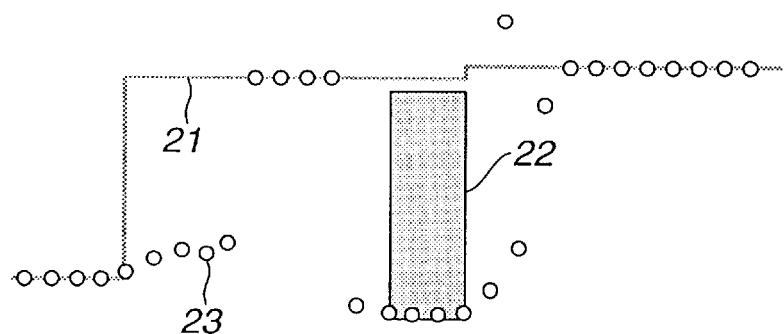

FIG. 5B shows a plotted row 23 of the distance measuring values, repeatedly measured using distance measuring unit 1A at the parking zone shown in FIG. 5A.

Figure 6:
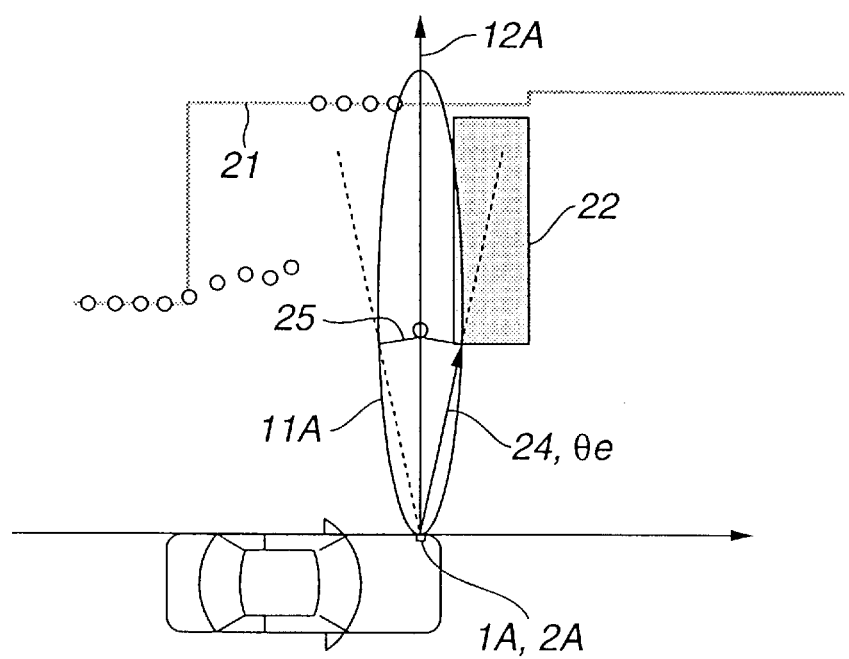
FIG. 6 is an explanatory view for explaining a pattern of the distance measurement at the parking zone shown in FIGS. 5A and 5B.

FIG. 6 shows a measurement situation of the position of the object at the parking zone shown in FIG. 5A.

As described above, distance measuring unit 1A has the spread detection beam and can accurately detect the distance to the obstacle but cannot accurately detect the direction of the vehicle. Suppose now that the distance is detected by the distance measuring unit 1A at a vehicular position shown in FIG. 6. The distance measurement value, in this case, is a distance 24 to the nearest point of the parked vehicle 22. However, a width of a detection range 11A of distance measuring unit 1A is varied in accordance with the distance measurement value as shown in FIG. 3. The width 25 is present for the present distance measurement value 24. Since the distance measurement unit 1A is used to identify on which position of the obstacle is present within the width 25. In the distance measuring unit 1A using the spread detection beam, it is assumed that the obstacle is present on the center axis 12A of the detection beam.

In the case where the distance measuring value is needed to be largely varied at the end of the parked vehicle 22, the direction of the obstacle cannot accurately be detected so that a large deviation between ends of the wall 21 and parked vehicle 22 and variation plotted points of dot rows 23 of the distance measurement values occurs as shown in FIG. 5B. At the next step S2 in FIG. 4, in order to identify a point at which the distance measuring value is largely varied, a variation rate of the distance measurement value is calculated. First, prior to a calculation of the variation rate of the distance measurement value, a vehicular behavior causes the distance measurement value to be corrected.

For example, if the vehicle is moved obliquely to wall 21 which is the object to the vehicle, the distance measurement value to wall 21 has a dot row having a certain gradient and an average value of the dot row is varied according to a vehicular behavior. It is, hence, difficult to identify a point at which the distance measurement value is changed. The distance measurement value is corrected according to the vehicular behavior. A two-dimensional coordinate system is set on a road plane, the vehicular position in the coordinate system is Pc (xc, yc) and an obstacle position is P0 (x0, y0).

The obstacle position P0 is a displacement from a vehicular position Pc. Hence, the obstacle position P0 is converted into an absolute position Pc+P0 in the coordinate system of the road plane which is converted into RAM 6c as the obstacle position Pc+P0 which is not dependent on the vehicular behavior.

In this embodiment, distance measurement value R of distance measurement unit 1A at a time point t is represented by R(t) based on the vehicular behavior. A variation rate of a latest distance measurement value R(t0) is calculated on the basis of latest distance measurement value R(t1) before one measurement period, distance measurement value R (tn) before n measurement period R(tn), and past distance measurement average value ave(R(t1), R(tn)) before one period from n period before using the following equation.

$$R(t0)-ave(R(t1), R(tn)) \quad (1).$$

At step S3 in FIG. 4, the variation rate of latest distance measurement value R(t0) is determined to be in excess of a threshold value.

$$|R(t0)-ave(R(t1), R(tn))|>k \cdot \sigma(R(t1), R(tn)) \quad (2),$$

It is noted that $\sigma(R(t1), R(tn))$ denotes a standard deviation of past distance measurement values from n period before to one period before. In addition, k denotes a coefficient to determine an optimum threshold value and is determined according to an experiment.

If the variation rate of the latest distance measurement value R(t0) is in excess of a threshold value, a point of the latest distance measurement value R(t0) on the center axis 12A of the distance detection beam is a change point of distance measurement value. Then, the routine goes to a step S4. On the other hand, if the variation rate of the latest distance measurement value R(t0) is equal to or below the threshold value, the point of latest distance measurement value R(t0) is not the change point of distance measurement value and the routine returns to step S1 and the above-described processing is repeated. It is noted that each detection characteristic of distance measurement units 1A through 1D is such as shown in FIG. 3. That is to say, it becomes impossible to measure the distance of the obstacle present in a nearest range and a remote range exceeding a predetermined distance. From the distance measurement units 1A through 1D, a non-detection signal is outputted. Hence, the point at which the output signal of each of distance measurement units is changed from the non-detection signal to the distance measurement value and the point at which the output signal thereof is changed from the distance measurement value to the non-detection signal are the change points of distance measurement values.

At the next step S4 in FIG. 4, microcomputer 6 estimates the direction in which the obstacle is present on the basis of measurement result of distance measurement value R(t0) at the time point t0 at which the change point is detected becomes smaller than the past average values are (R(t1), R(tn)) and the variation rate of latest distance measurement value R(t0) described in numerical equation (1) indicates a negative, it is estimated that the obstacle enters the vehicular forwarding direction of detection range 11A of distance measurement unit 1A. Hence, in this case, microcomputer 6 places an importance on the vehicular forwarding direction. On the contrary, if the latest distance measurement value R(t0) detecting the change point at the time point to becomes larger than the past average value ave (R(t1)), R(tn)) and the variation rate of the latest distance measurement value R(t0) shown in equation (1) indicates positive, it is estimated that the obstacle exits through an opposite side to the vehicular forwarding direction of detection range 11A of distance measurement unit 1A. Hence, in this case, microcomputer 6 places the importance on the opposite side to the vehicular forwarding direction. That is to say, a range to be noticed of detection range 11A of distance measurement units 1A is varied according to a movement direction of the vehicle.

In a case where the distance 24 to the nearest point of the obstacle (parked vehicle 22) is detected, it is estimated that the obstacle is present in one end of the vehicular movement direction from among the respective ends of the width 25 of detection range 11A at the position of the distance 24 on the center axis 12A and the direction from the distance measurement unit 1A to the estimated position of the obstacle is assumed to be an estimated direction θe of the obstacle. This direction θe can be determined according to distance 24 and width 25.

In this way, since the direction of the obstacle surrounding the vehicle is estimated with the movement direction of the vehicle taken into consideration, an accurate direction of the obstacle can be determined and the data quantity in the image processing can be reduced. The image processing time can be shortened. Thus, the position of the obstacle can be detected.

It is noted that, in a case where a mount position between distance measurement unit 1A and camera 2A on the road plane is deviated, estimation direction θe of the obstacle viewed from distance measurement unit 1A is converted into the direction viewed from camera 2A.

Figure 7A:
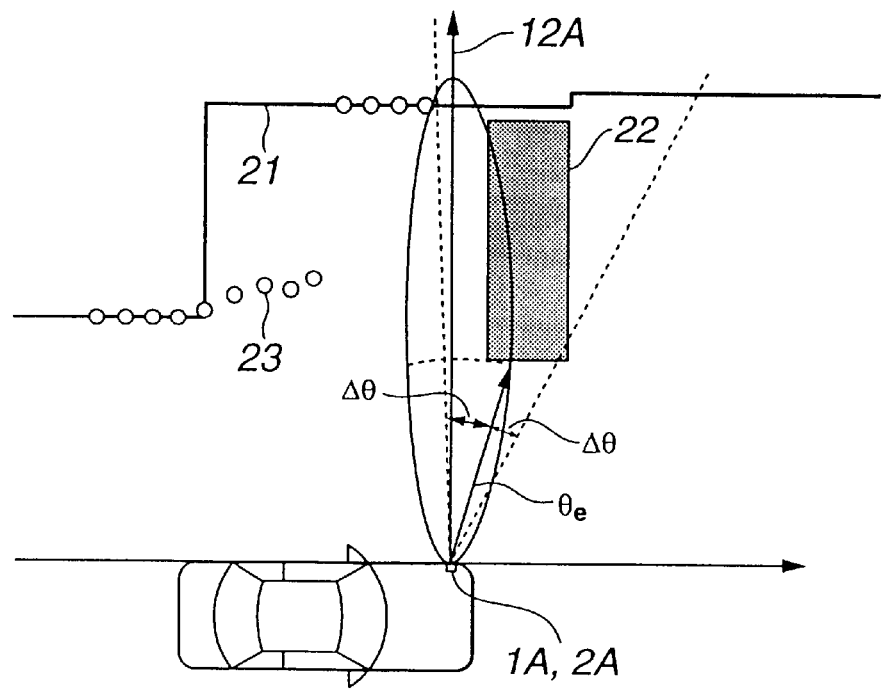
FIGS. 7A and 7B are explanatory views for explaining a method of determining a range of an image processing from photographed image to detect a direction of the object according to the image processing carried out in the apparatus for detecting the object present in the surrounding detection zone shown in FIGS. 1 and 2.
Figure 7B:
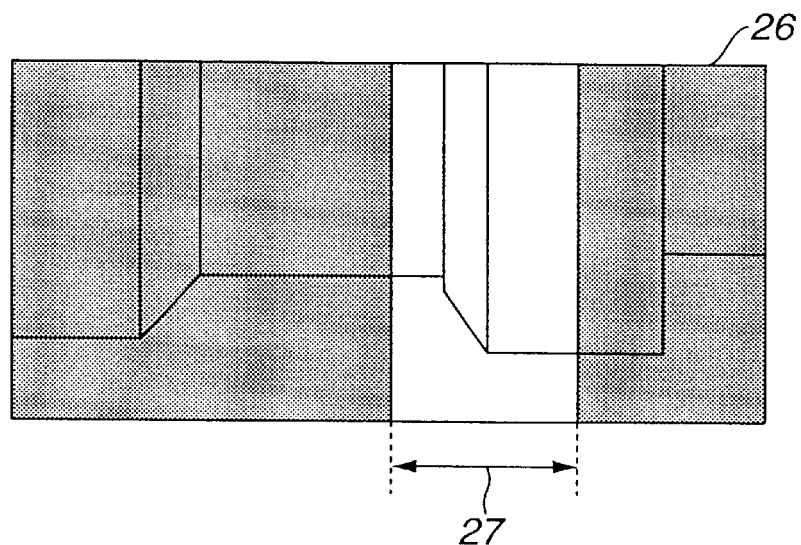

At the next step S5 in FIG. 4, microcomputer 6 determines a range (an image region to be image processed) for detecting a direction of the obstacle through the image processing from the photographed image of camera 2A based on estimated direction θe of the obstacle, viz., image processing range. Specifically, range 27 corresponding to a range of ±Δθ with estimated direction θe of the vehicle is range for detecting the direction of the obstacle through the image processing from among the video image photographed by camera 2A as shown in FIGS. 7A and 7B.

Δθ is determined according to a vehicular velocity V. For example, when vehicular velocity V is high, Δθ is widened. When vehicular velocity V is low, Δθ is narrowed. In addition, Δθ may be determined according to latest distance measurement value R(t0). For example, in a case where distance measurement value R(t0) is small, Δθ is widened. If distance measurement value R(t0) is large, Δθ is narrowed. In this way, as vehicular velocity V becomes higher, the image processing range (image region to be processed under the image processing) becomes larger. As the distance measurement value R(t0) becomes smaller, the image processing range (image region to be processed under the image processing) becomes large. Thus, an optimum image processing range (image region to be processed under the image processing) which accords with vehicular velocity V and distance measurement value R(t0) can be determined. Consequently, the direction of the obstacle can accurately be detected at an earlier timing.

It is noted that image processing range (image region to be processed under the image processing) within the photographed image is not limited within (θe−Δθ) to (θe+Δθ). As described above, in a case where the variation rate of latest distance measurement value R(t0) shown in equation (1) indicates negative, it is estimated that obstacle enters at the vehicular forwarding direction of the detection range 11A of distance measurement unit 1A. Hence, in this case, microcomputer 6 takes a notice of the vehicular forwarding direction and assumes the image processing range as θe through (θe+Δθ) (viz., microcomputer 6 limits the image region to be processed under the image processing to an image region of θe through (θe+Δθ)) since the obstacle is estimated to enter at the vehicular forwarding direction with respect to the vehicle).

On the contrary, if the variation rate of latest distance measurement value R(t0) shown in equation (1) indicates positive, it is estimated that the obstacle has exited through the opposite side to the vehicular forwarding direction of detection range 11A of distance measurement unit 1A. Hence, in this case, microcomputer 6 selects the opposite side to the vehicular forwarding direction and the image processing range (the image region to be processed under the image processing) is assumed to be (θe−Δθ) through θe.

In this way, the image processing range (the image region to be processed under the image processing) is limited according to a movement direction of the vehicle so that the data quantity of image processing can be reduced and the image processing time can be shortened. Consequently, the position of the obstacle can accurately be detected at the earlier timing. Next, at step S6 in FIG. 4, microcomputer 6 detects the direction of the obstacle by processing the photographed image of direction detection range.

Figure 8A:
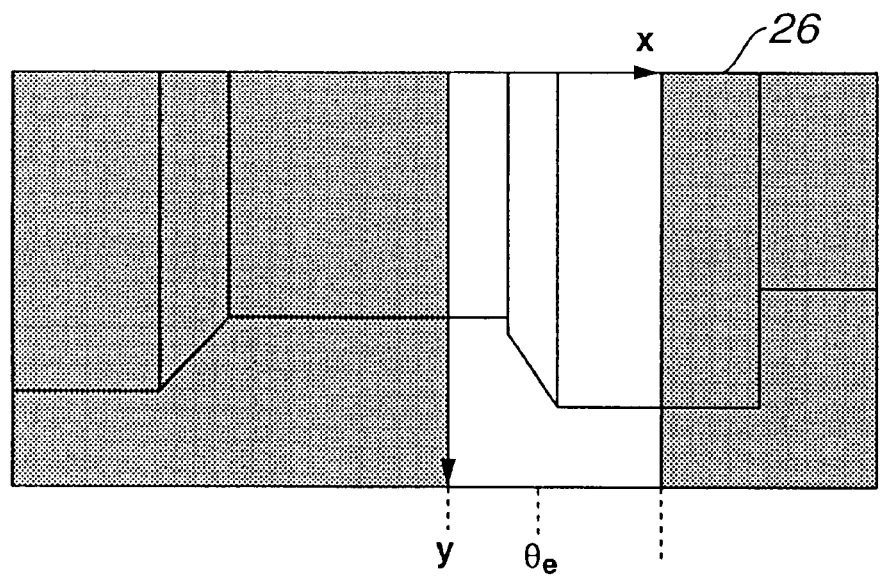
FIGS. 8A and 8B are explanatory view for explaining a method of detecting the direction of the object through the image processing carried out in the apparatus for detecting the object present in the surrounding detection zone shown in FIGS. 1 and 2.
Figure 8B:
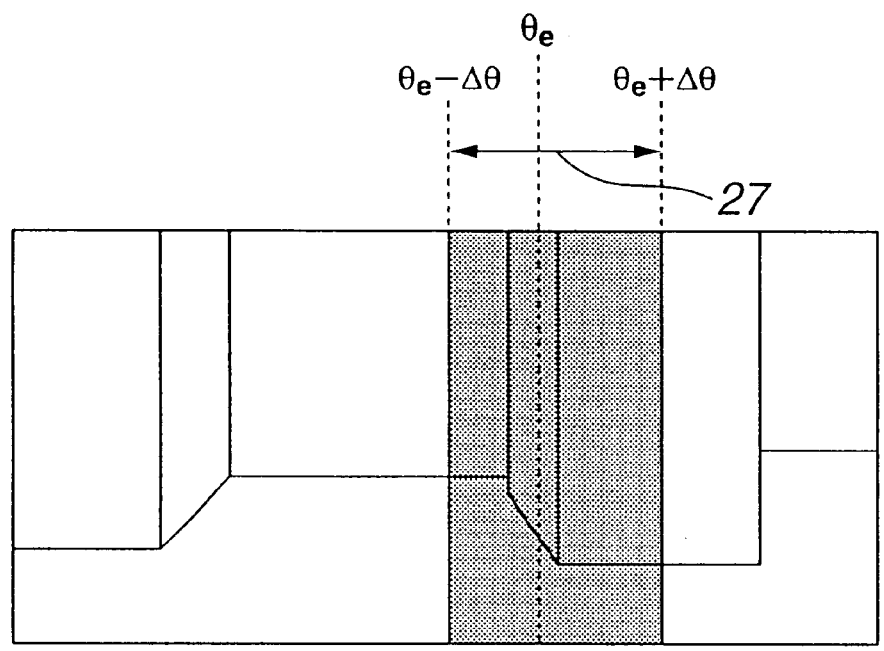

Specifically, a longitudinal edge extraction processing for image in range 27 detecting the direction of the obstacle within the photographed image 26 shown in FIG. 8A. Thus, a longitudinal edge E(θ) corresponding to the end portion of parked vehicle 22, as shown in FIG. 8B, is detected. The extracted longitudinal edge E(θ) is evaluated using the longitudinal edge E(θ).

$$M=(\Sigma|E(\theta e)-E(\theta)|^2)/I(E(\theta)) \qquad (3).$$

In the equation (3), M denotes an evaluation function, $|E(\theta e)-E(\theta)|$ denotes a distance from longitudinal edge E(θe) in θe direction and longitudinal edge E(θ) to be an object of evaluation.

In addition, I(E(θ)) denotes an edge strength and is expressed by a number of votes in a ρ−θ space (Hough space) when an accumulated value in an y-axis direction of the luminance or when a Hough conversion is carried out. Microcomputer 6 selects the edge which makes the evaluation function minimum from among longitudinal edges E(θ) extracted from the image in range 27 and the direction of the selected edge is direction θd of the edge direction.

As described above, the longitudinal edge corresponding to the ends of the obstacle present surrounding the vehicle is selected on the basis of the estimated direction θe and the edge strength E(θ) and the position of the object surrounding the vehicle is detected on the basis of the selected direction of the longitudinal edge and distance measurement value. The accurate direction of the obstacle can be achieved and the position of the obstacle can accurately be detected.

At a step S7 in FIG. 4, the position of the obstacle at the parking zone located at the left side as shown in FIG. 8A is detected, a road map which has locally trapped the obstacle is prepared and displayed through display 7. It is noted that if the distance shorter than a preset alarm distance is detected, speaker 8 is used to produce the alarm for the vehicular occupant.

In this way, since the distance to the obstacle present surrounding the vehicle is measured, the photographed image of the surrounding area of the vehicle is processed to extract longitudinal edge(s) so that the position of the obstacle present surrounding the vehicle is detected on the basis of a direction of the extracted longitudinal edge and distance measurement value. Hence, even if the distance measurement unit for the spread detection beam is used, the position and profile of the obstacle present surrounding the vehicle can accurately be detected at the earlier timing.

In addition, the direction of the obstacle present in the surrounding area of the vehicle is estimated on the basis of the variation rate of distance measurement value along with the vehicular movement and the image region at which the image processing within the photographed image is determined on the basis of the estimated direction of object. Then, the longitudinal edge is extracted from image processing range within the photographed image and position of the obstacle present surrounding the vehicle is detected on the basis of the extracted longitudinal edge direction and distance measurement value. Hence, the date quantity of image processing can be reduced and the position of the obstacle can be detected at the earlier timing by shortening the image processing time.

It is noted that the distance of the vehicle to the object includes the meaning that the distance of the distance measurement unit mounted portion of the vehicle to the object present in the surrounding area of the vehicle and the direction of the object has the meaning that the estimated direction of θe with respect to the vehicular forwarding direction (vehicular movement direction) with reference to, for example, FIG. 7A.

The entire contents of a Japanese Patent Application No. 2000-312077 (filed in Japan on Oct. 12, 2000) are herein incorporated by reference. Although the invention has been described above by reference to certain embodiment of the invention, the invention is not limited to the embodiments described above. Modifications and variations of the embodiments described above will occur to those skilled in the art in the light of the above teachings. The scope of the invention is defined with reference to the following claims.

What is claimed is:

1. A method for detecting a position of an object present in a surrounding detection zone of an automotive vehicle, comprising:

measuring a distance of the vehicle to a longitudinal edge of the object using detection beams;

photographing the surrounding detection zone of the vehicle;

image processing the photographed surrounding detection zone to extract at least one longitudinal edge from the photographed surrounding detection zone of the vehicle, wherein the longitudinal edge obtained by the image processing is the longitudinal edge of the object to which the distance from the vehicle has been measured, and wherein a direction of the longitudinal edge of the object is detected through the image processing; and detecting the position of the object relative to the vehicle from the direction of the extracted longitudinal edge and a measured value of the distance to the object.

2. A method for detecting a position of an object present surrounding an automotive vehicle as claimed in claim 1, further comprising: estimating a direction of the object to the vehicle on the basis of a variation in the measured value of the distance involved in a movement of the vehicle; and determining that an image region processed under an image processing within the photographed surrounding detection zone is carried out on the basis of the estimated direction of the object and wherein, when image processing the photographed surrounding detection zone of the vehicle, the longitudinal edge is extracted from the determined image region processed under the image processing within the photographed surrounding detection zone of the vehicle.

3. A method for detecting a position of an object present surrounding an automotive vehicle as claimed in claim 2, wherein, when estimating the direction of the object, a direction of the movement of the vehicle is taken into consideration.

4. A method for detecting a position of an object present surrounding an automotive vehicle as claimed in claim 2, wherein, when determining the image region processed under an image processing, the image region is limited in accordance with a movement direction of the vehicle.

5. A method for detecting a position of an object present surrounding an automotive vehicle as claimed in claim 2, further comprising detecting a vehicular velocity and wherein, when determining the image region processed under the image processing, the image region becomes wider as a magnitude of the detected vehicular velocity becomes larger.

6. A method for detecting a position of an object present surrounding an automotive vehicle as claimed in claim 2, wherein, when determining the range of the image processing, as the measured value of the distance becomes smaller, the image region processed under the image processing becomes wider.

7. A method for detecting a position of an object present surrounding an automotive vehicle as claimed in claim 2, wherein the extracted longitudinal edge is plural and further comprising selecting a longitudinal edge corresponding to an end portion of the object present in the surrounding detection zone of the vehicle from among the extracted longitudinal edges on the basis of the estimated direction of the object and an edge strength and wherein, the position of the object is detected on the basis of a direction of the selected longitudinal edge to the vehicle and the measured value of the distance.

8. A method for detecting a position of an object present surrounding an automotive vehicle as claimed in claim 1, further composing: detecting a vehicular behavior; and correcting the measured value of the distance on the basis of a detected value of the vehicular behavior.

9. A method for detecting a position of an object present surrounding an automotive vehicle as claimed in claim 2, wherein a measurement range of the distance measurement when measuring the distance to the object is approximately made coincident with a photographing range of photographing the surrounding detection zone of the vehicle when photographing the surrounding detection zone of the vehicle.

10. An apparatus for detecting a position of an object present in a surrounding detection zone of an automotive vehicle, comprising:

a distance measurement unit adapted to measure a distance of the vehicle to a longitudinal edge of the object using detection beams;

a photograph device adapted to photograph the surrounding detection zone of the vehicle;

an image processing section adapted to perform image processing of the photographed surrounding detection zone to extract at least one longitudinal edge from the photographed surrounding detection zone image, wherein the longitudinal edge obtained by the image processing is the longitudinal edge of the object to which the distance from the vehicle has been measured, the image processing section being further adapted to detect a direction of the longitudinal edge of the object through the image processing; and a position detecting section adapted to detect the position of the object to the vehicle from the direction of the extracted longitudinal edge and a measured value of the distance to the object.

11. An apparatus for detecting a position of an object present surrounding an automotive vehicle as claimed in claim 10, further comprising: object direction detecting section that estimates a direction of the object to the vehicle on the basis of a variation in the measured value of the distance involved in a movement of the vehicle; and an image region determining section that determines an image region to be processed under an image processing within the photographed surrounding detection zone that is carried out on the basis of the estimated direction of the object and wherein, image processing section extracts the longitudinal edge from the determined image region processed under the image processing within the photographed surrounding detection zone image of the vehicle.

12. An apparatus for detecting a position of an object present surrounding an automotive vehicle as claimed in claim 11, wherein, when estimating the direction of the object by the object direction estimating section, a direction of the movement of the vehicle is taken into consideration.

13. An apparatus for detecting a position of an object present surrounding an automotive vehicle as claimed in claim 11, wherein, when the image region determining section determines the image region processed under the image processing, the image region is limited in accordance with a movement direction of the vehicle.

14. An apparatus for detecting a position of an object present surrounding an automotive vehicle as claimed in claim 11, further comprising a vehicular velocity detector to detect a vehicular velocity and wherein, when the image region determining section determines the image region processed under the image processing, the image region becomes wider as a magnitude of the detected vehicular velocity becomes larger.

15. An apparatus for detecting a position of an object present surrounding an automotive vehicle as claimed in claim 11, wherein, when the image region determining section determines the image region processed under the image processing, as the measured value of the distance becomes smaller, the image region processed under the image processing becomes wider.

16. An apparatus for detecting a position of an object present surrounding an automotive vehicle as claimed in claim 11, wherein the extracted longitudinal edge is plural and further comprising a longitudinal edge selecting section that selects a longitudinal edge corresponding to an end portion of the object present in the surrounding detection zone of the vehicle from among the extracted longitudinal edges on the basis of the estimated direction of the object and an edge strength and wherein, object position detecting section detects the position of the object on the basis of a direction of the selected longitudinal edge to the vehicle and the measured value of the distance.

17. An apparatus for detecting a position of an object present surrounding an automotive vehicle as claimed in claim 10, further comprising: a vehicular behavior detector to detect a vehicular behavior*j and a correcting section that corrects the measured value of the distance on the basis of a detected value of the vehicular behavior.

18. An apparatus for detecting a position of an object present surrounding an automotive vehicle as claimed in claim 11, wherein a measurement range of the distance measurement by the distance measurement unit is approximately made coincident with a photographing range of photographing the surrounding detection zone of the vehicle by the photograph device.

19. An apparatus for detecting a position of an object present surrounding an automotive vehicle as claimed in claim 10, wherein the distance measurement unit comprises a plurality of radars installed on respective side edges of vehicular front and rear ends and the photograph device comprises a plurality of cameras located adjacent to the respective radars.

20. An apparatus for detecting a position of an object present in a surrounding detection zone of an automotive vehicle, comprising:

distance measurement means for measuring a distance of the vehicle to a longitudinal edge of the object using detection beams;

photographing means for photographing the surrounding detection zone of the vehicle;

image processing means for performing an image processing for the photographed surrounding detection zone to extract at least one longitudinal edge from the photographed surrounding detection zone image, wherein the longitudinal edge obtained by the image processing means is the longitudinal edge of the object to which the distance from the vehicle has been measured, and for detecting a direction of the longitudinal edge of the object through the image processing; and position detecting means for detecting the position of the object to the vehicle from the direction of the extracted longitudinal edge and a measured value of the distance to the object.

21. A method for detecting a position of an object present in a surrounding detection zone of an automotive vehicle, comprising:

measuring a distance of the vehicle to the object using detection beams;

photographing the surrounding detection zone of the vehicle to obtain an image;

estimating a direction ($\theta e$) of the object as viewed from a distance measurement device;

determining an optimum image processing range ($\pm \Delta \theta$);

performing a longitudinal edge extracting processing for the image within a range in which the direction of the object is present to detect a longitudinal edge $E(\theta)$ through image processing corresponding to an edge portion of a vehicular surrounding obstacle; and selecting the longitudinal edge detected through image processing corresponding to the edge portion of the vehicular surrounding obstacle on the basis of estimated direction ($\theta e$) and edge intensity, wherein the position of the object present in the surrounding detection zone of the vehicle is detected from the selected longitudinal edge detected through image processing and the measured value of the distance.

* * * * *